United States Patent [19]

Fisher et al.

[11] Patent Number: 4,591,019
[45] Date of Patent: May 27, 1986

[54] DETECTOR RESPONSIVE FLUID ACTUATED AUXILIARY BRAKING SYSTEM

[76] Inventors: Brian Fisher, 34 St. Giles Way; Raymond R. Westmoreland, 11 St. Giles Way, both of Cropwell Bishop, Nottinghamshire, England

[21] Appl. No.: 755,227

[22] Filed: Jul. 15, 1985

Related U.S. Application Data

[63] Continuation of Ser. No. 556,059, Nov. 29, 1983, abandoned, which is a continuation-in-part of Ser. No. 314,783, Oct. 26, 1981, abandoned, which is a continuation-in-part of Ser. No. 59,287, Jul. 20, 1979, abandoned.

[51] Int. Cl.$^4$ ............................................. B60T 7/16
[52] U.S. Cl. ........................... 180/275; 188/151 A; 192/4 R; 293/5; 303/2; 303/13; 303/68
[58] Field of Search .............. 293/5, 4, 2, 117, 142, 293/149; 303/2-3, 9, 7, 13, 68-69, 18-19, 14, 15, 24 R; 180/275-278; 192/4; 188/2 R, 151 A; 340/61; 200/61.44, 61.43

[56] References Cited

U.S. PATENT DOCUMENTS

| | | | |
|---|---|---|---|
| 2,588,815 | 3/1952 | Fasolino | 180/275 |
| 3,059,716 | 10/1962 | Iserman et al. | 180/275 |
| 3,269,783 | 8/1966 | Kriz | 293/5 |
| 3,456,988 | 7/1969 | Gibbons et al. | 303/13 X |
| 3,510,837 | 5/1970 | Lepore et al. | 340/61 |
| 3,923,330 | 12/1975 | Viall, Sr. et al. | 293/5 X |
| 3,947,061 | 3/1976 | Ellis | 293/5 |
| 3,986,577 | 10/1976 | Ebbesson et al. | 180/275 |
| 4,017,125 | 4/1977 | Durling | 303/9 X |
| 4,105,237 | 8/1978 | Viall, Sr. et al. | 293/5 X |
| 4,146,107 | 3/1979 | Ebbeson et al. | 180/275 |
| 4,207,958 | 6/1980 | Viall, Sr. et al. | 180/275 X |

FOREIGN PATENT DOCUMENTS

| | | |
|---|---|---|
| 1470129 | 4/1977 | United Kingdom . |
| 2027828 | 2/1980 | United Kingdom . |

Primary Examiner—Douglas C. Butler
Attorney, Agent, or Firm—Paul and Paul

[57] ABSTRACT

An auxiliary air brake system is provided for a mobile vehicle which has a drive selector having reverse and other positions and which has a main air brake system which includes a plurality of compressed air tanks, main conduit including a foot brake line and a hand brake line for connecting at least one of the tanks to wheel brake chambers, and air control valves in the main conduit for controlling air pressure at the wheel brake chambers. The auxiliary air brake system includes a first additional air control valve controlled by the drive selector, a detector mounted at the rear of the vehicle positioned to be actuated by contact with an external object during reverse movement of the vehicle, a second additional non-electrically actuated air control valve actuable in response to actuation of the detector member and additional conduit which connects the first and second additional air control valves to control the pressure at the brake wheel chambers when the detector member is in its actuated condition and the drive selector is in reverse. The second non-electrically actuated air control valve has a spring biased operating plunger having at one end a roller which is contacted by the detector member to depress the plunger thereby to connect pressurized air to the auxiliary braking system.

3 Claims, 16 Drawing Figures

VALVE 131 IS PRIOR ART

DETECTOR RESPONSIVE FLUID ACTUATED AUXILIARY BRAKING SYSTEM

This application is a continuation application of U.S. application Ser. No. 556,059 filed Nov. 29, 1983, now abandoned, which was a continuation-in-part application of Ser. No. 314,783 filed Oct. 26, 1981, now abandoned, which was a continuation-in-part application of Ser. No. 059,287 filed July 20, 1979, now abandoned.

FIELD OF THE INVENTION

This invention relates to vehicle braking systems and more particularly concerns fluid actuated braking systems.

BACKGROUND OF THE INVENTION

Conventional fluid actuated vehicle braking systems include a source of fluid under pressure such as a compressor driven by the vehicle prime mover and connected to and building pressure in a fluid tank. The tank is connected by a main serviceline to the brake mechanism, the line including valve means actuated by the vehicle driver such as by operating a vehicle brake pedal. The service line includes means which on release of the pedal cause the line to be exhausted to atmosphere where the fluid is gas e.g. air or into a low pressure zone in the case of the fluid being a liquid i.e. oil.

Many conventional circuits include a second service line known as an emergency line which is supplied with pressurised fluid from a secondary pressurised fluid tank. Systems involving main and emergency service lines are known as two-line systems and are compulsory in many countries.

Three line systems are sometimes employed and in some countries are obligatory. In such systems a third service line, sometimes called a "dead man line" is included which line is actuated by action by the vehicle driver as by application of the vehicle hand brake by the driver, and operable if the main and emergency circuits are inactive or fail.

When a driver reverses a vehicle, particularly a large heavily laden goods carrying vehicle, his rear vision is often obstructed and he is unable to see an obstacle behind his vehicle. Rigid obstacles such as a loading bay or a wall may be damaged and also cause damage to the vehicle and where the obstacle is a human or animal body serious injury or death may result.

Detector devices are known which actuate a warning such as a horn or light in the driver's cab to alert the driver to apply the brakes but these suffer from the disadvantage that the driver's reaction time may be too long for a collision to be avoided. Also when the obstacle struck has moved out of contact with the detector it then ceases to activate the warning device.

It has also been proposed to provide detector devices at the rear of a vehicle or trailer which are connected into the brake circuit to apply the brakes.

One example of such prior proposal, is U.S. Pat. No. 2,588,815 Fasolino. This specification discloses a system for use with air brakes in which a detector bar is associated with switch means and a gear lever is also associated with switch means whereby a solenoid valve is operated when both switch means are also operated. The solenoid valve opens a fluid valve which is in a simple by-pass circuit of the foot brake valve to apply the brakes when both switch means are actuated. Fasolino does not, however, describe a practical system. In particular, there is no indication of the manner in which the brakes are released as the solenoid valve merely opens and closes an air line between the air tank and the brakes and there is no provision for releasing the air from the brakes.

Similarly U.K. specification No. 1,470,129 describes a valve in a foot brake valve by-pass circuit which is operated by a switch associated with a detector bar and a switch associated with a gear lever. The arrangement described is however completely impractical as is the Fasolino proposal.

An object of the present invention is to provide a vehicle reversing brake system in which the aforesaid disadvantages are minimised or eliminated.

A further object of the present invention is to provide a vehicle reversing brake system in which the braking action is such as to distinquish between contact with relatively rigid objects and contact with movable objects.

According to one aspect of the present invention we provide a vehicle braking system comprising fluid actuated brakes, at least one source of pressurised fluid, at least one service fluid line connected to said source of pressurised fluid, said braking system being arranged and adapted to apply the brakes in response to a change in pressure in said service line, the improvement which comprises the addition of an auxiliary braking system comprising:

(a) an auxiliary fluid circuit including a fluid control valve;
(b) a detector mounted at the rear of the vehicle and movable between operative and inoperative positions;
(c) first control means responsive to the position of the detector to act on said fluid control valve to cause it to provide an open fluid path in said auxiliary fluid circuit when the detector is in its operative position and to obstruct said fluid path when the detector is in its inoperative position;
(d) second control means independent of said first control valve and responsive to the position a drive-controlled reverse selector on the vehicle, said second control means being arranged to insure that the fluid path in said fluid circut is open only when said driver-controlled reverse selector is in a vehicle-reversing condition;
(e) said auxiliary circuit fluid control valve being so connected in said service line that upon operation of said fluid control valve, the fluid path in the service line between said valve and said source of pressurised fluid is obstructed and the fluid path between said valve and said brakes is opened.

According to another aspect of the present invention we provide a vehicle braking system comprising fluid actuated brakes, at least one source of pressurised fluid, at least one service fluid line connected to said source of pressurised fluid, said braking system being arranged and adapted to apply the brakes in response to a change in pressure in said service line, the improvement which comprises the addition of an auxiliary braking system comprising:

(a) an auxiliary fluid circuit including a fluid control valve;
(b) a detector mounted at the rear of the vehicle and movable between operative and inoperative positions;
(c) first control means responsive to the position of the detector to act on said fluid control valve to cause it to provide an open fluid path in said auxiliary fluid circuit when the detector is in its operative position and to obstruct said fluid path when the detector is in its inoperative position;

(d) second control means independent of said first control means and responsive to the position of a driver-controlled reverse selector on the vehicle, said second control means being arranged to insure that the fluid path in said fluid circuit is open only when said drive-controlled reverse selector is in a vehicle-reversing condition;

(e) said auxiliary circuit fluid control valve being so connected in said service line that upon operation of said fluid control valve, the fluid path in the service line between said valve and said source of pressurised fluid is obstructed and the fluid path between said valve and said brakes is opened; and (f) said auxiliary fluid circuit being arranged to be vented to atmosphere only when said first and second control means both are in a condition to cause an open fluid path in said auxiliary circuit.

In this specification the expressions "fluid service line" refers to one of the fluid lines present in the conventional braking system, e.g. the principal service brake line operated by the driver's foot brake and the emergency line in a two-line system. In a three-line system it includes the additional emergency line known as the "dead man line".

The systems described, with reference to the drawings, are air-brake systems which operated with air under an elevated pressure but they may also be operated with air under reduced pressure, i.e. a vacuum system. The invention is also applicable to equivalent hydraulic systems.

DETAILED DESCRIPTION OF EXISTING BRAKING SYSTEMS

Figure 1:
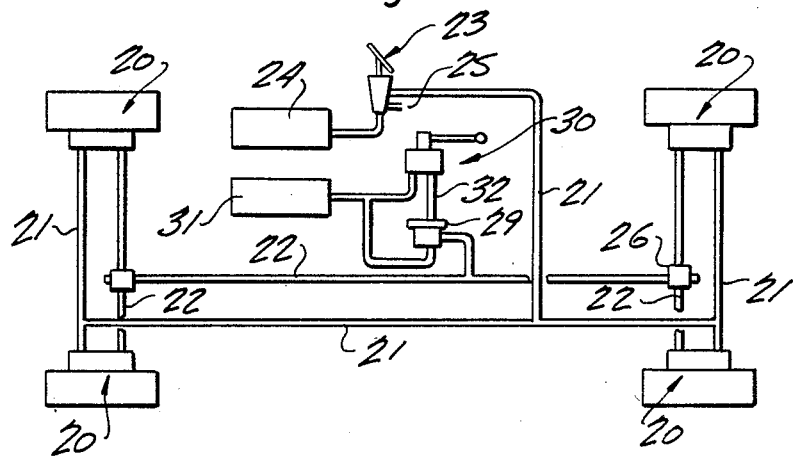
FIG. 1 is a simplified circuit diagram of a conventional two-line air brake system.

FIG. 1 of the accompanying drawings shows a simplified conventional two-line system which may be used, for example on a rigid vehicle. The system incorporates four brake chambers 20 each of which is connected to a main service line 21 and an emergency/hand brake line 22.

The main service line 21 is connected to the driver's foot pedal valve 23 which in turn is connected to a main pressurised air tank 24.

Figure 4:
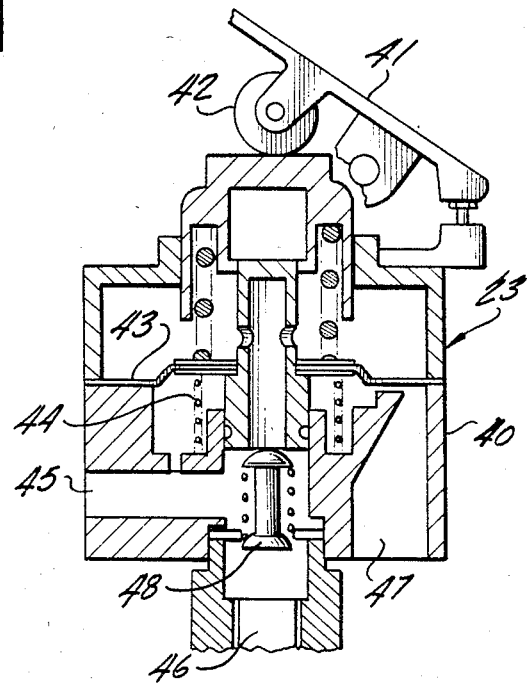
FIG. 4 is a schematic illustration of a foot brake valve suitable for use in the circuit of FIG. 1.

The foot brake valve which is conventionally employed in both two line and three-line systems, is operated by a a foot treadle. One form of foot brake valve which can be used as a foot brake valve 23 is shown in FIG. 4 and as can be seen it comprises a body 40, having a treadle 41 pivoted about a roller 42. The detailed operation of this valve is not described as it is not relevant to the present invention but, essentially, it comprises a diaphragm 43 with a diaphragm return spring 44 which diaphragm controls the flow of air through the outlet port 45 to the brake system from the inlet port 46 from the pressurised air tank.

The foot brake valve also includes an exhaust port 47 which is opened when the treadle 41 is in its normal position so that the air line of the brake system connected to the outlet port 45 is exhausted to atmosphere. In this position the inlet 46 is closed by means of the inlet valve 48. The exhaust port 47 enables the brakes to be released when the treadle 41 is returned to its normal position by exhausting the air-line 21 in FIG. 1 to atmosphere via the outlet 25 which represents the exhaust port 47.

The emergency/hand brake line 22 incorporates two quick release valves 26 which allow air to be released from the brake chambers 20 quickly when the brakes are deactivated.

Figure 2:
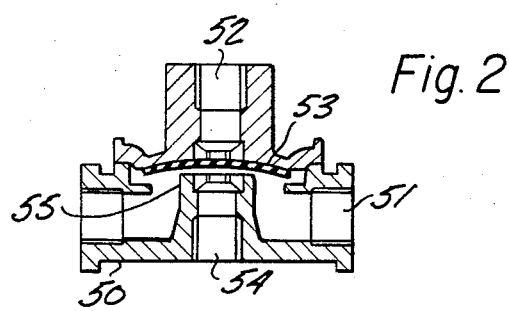
FIG. 2 is a schematic illustration of a quick release valve suitable for use in the circuit of FIG. 1.

A conventional quick release valve useful for use as valves 26 is shown in FIG. 2. It comprises a body 50 having outlets 51 connected to the emergency brake cylinders of a double chamber brake and an inlet 52 connected to the emergency air-line of the braking system (air-line 22 in FIG. 1). When pressure is applied to the inlet 52, the diaphragm 53 is lifted from the seat 55 thereby supplying pressure to the outlets 51 and hence to the brake chambers and closing an exhaust port 54. When the pressure at inlet 52 is released outlets 51 are connected to the exhaust port 54 when the diaphragm returns to the position shown in FIG. 2 thereby releasing the brakes.

Quick release valves are employed to obtain rapid actuation of the brakes in response to a relatively small decrease in pressure in the air-line. A slow release of pressure would cause the brakes to be actuated only slowly in the absence of quick release valves.

When a handbrake function is required the brakes are actuated by means of a hand operated valve 30 connected to a secondary air tank 31. This valve 30 allows pressurised air from the tank 31 to be connected to the relay valve 29 by way of the air-line 32.

Figure 3:
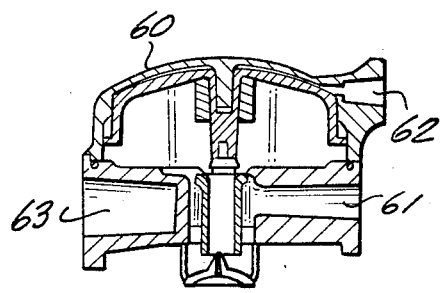
FIG. 3 is a schematic illustration of a relay valve suitable for use in the circuit of FIG. 1.

The relay valve 29 may be a conventional relay valve such as the valve shown in FIG. 3. This valve comprises a housing 60 having an inlet 61 from a pressurised air tank such as the secondary air tank 31 in FIG. 1 and an inlet 62 which may be connected to a driver operated valve such as the valve 30. An outlet 63 is connected to the air lines to the brake chambers.

By means of this relay valve, a relatively small pressure applied at the inlet 62 will depress the valve element 64 and connect air from the inlet 61 to the outlet 63 to the brake chambers. By these means, it is possible to supply air rapidly from the tank 31 in response to a small change of pressure at the inlet 62.

Because of this quick response relay valves are frequently employed in long vehicles where the length of air line from the driver-controlled valve would cause an undesirable delay in the actuation of the brakes. The relay valve enables a secondary air tank disposed towards the rear of the vehicle to be used to supply air to the brake chambers in response to a change in air pressure in an air-line supplied from a main air tank towards the front of the vehicle. Such relay valves can be used in the main service line operated by the foot brake valve and/or in a secondary line.

Figure 5:
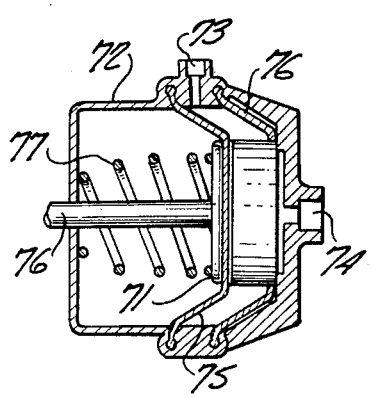
FIG. 5 is a schematic illustration of a double chamber brake actuator suitable for use in the two line system of FIG. 1.

FIG. 5 is a schematic illustration of a double diaphragm brake chamber such as can be employed as brake chambers 20 in the circuit of FIG. 1. It comprises a brake actuating link 70 which is axially movable in response to the movement of the plate 71 within the casing 72. The plate 71 is carried on a diaphragm 75 which, in turn, is connected to a second diaphragm 76. The plate 71 is biassed to the right as shown in FIG. 5 by the return spring 77.

Two inlets are provided, the first, 73, being connected to the main service line of the vehicle (e.g. line 21 of FIG. 1) and the second, 74, being connected to a secondary service line of the vehicle (e.g. line 22 of FIG. 1). It will be seen that pressure applied via either of the lines connected to inlets 73 and 74 will cause the diaphragm 75 to move to the left as shown in FIG. 5 thereby moving the plate 71 to the left together with the brake actuating link 70.

A convenient way of providing an emergency brake system is to use a brake chamber in which a secondary air-line applies pressure to hold the brakes in a deactivated condition against spring pressure. Removal of the air pressure causes the springs to actuate the brakes. Such brake chambers are referred to as "spring brakes".

Figure 6:
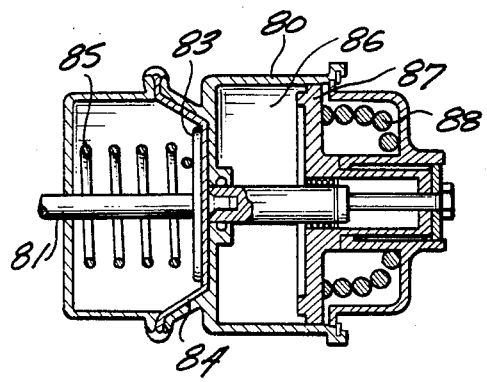
FIG. 6 is a schematic illustration of a spring brake which may be used in a circuit similar to that shown in FIG. 1.

An example of a conventional spring brake is shown in FIG. 6. It incorporates within a body 80 a brake actuating linkage 81 movable axially relative to the body 80. Air pressure applied by way of the main service line (air-line 21 in FIG. 1) of the vehicle causes the diaphragm 84 and plate 83 to move to the left as shown in FIG. 6, against the action of the return spring 85, and thus move the brake actuating linkage 81.

The secondary chamber 86 is connected to the air line of the emergency system (air line 22 in FIG. 1) which is normally maintained under pressure. This pressure maintains the piston 87 in the position shown in FIG. 6 with the spring 88 compressed. A drop in pressure in the chamber 86 will allow the spring 88 to move the piston 87 to the left as shown in FIG. 6, thereby moving the brake actuating link 81 to cause it to actuate the brakes.

Two line systems such as the one described above are often used on rigid vehicles and may also be used on articulated vehicles comprising a tractor and a trailer. Such vehicles have flexible connectors (conventionally called "suzies") which connect the tractor air lines to the trailer air lines. Usually because of the length of such tractor/trailer units the trailer is provided with its own air tank to operate its brakes the air from this tank being controlled by a relay valve such as the valve shown in FIG. 3.

Figure 7:
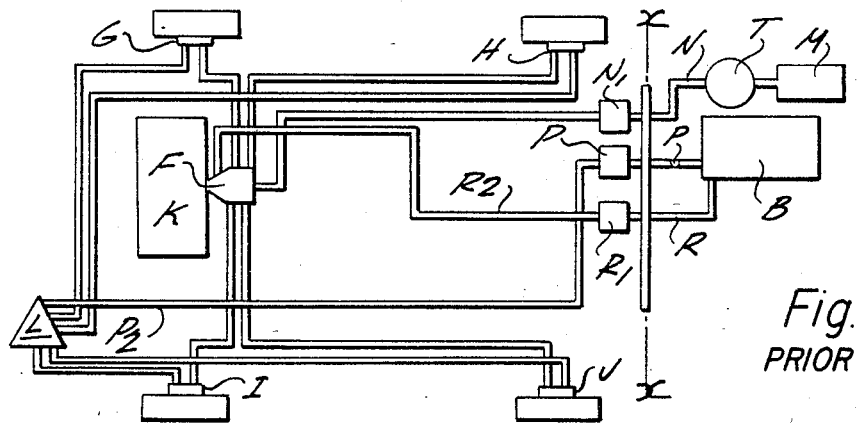
FIG. 7 is a simplified circuit diagram of a conventional three-line system for use with a tractor/trailer combination.

In some countries a third line is required by law and FIG. 7 is a simplied diagram of a conventional three line braking system as applied to a tractor/trailer arrangement. The diagram in FIG. 7 shows the basic tractor layout to the right of the vertical line X—X and the trailer layout to the left of the line X—X. It will be apparent that this circuit could be applied to a single unit as well as to a tractor/trailer.

In FIG. 7 of the drawings only the trailer brake operation is shown for simplicity, the tractor brakes being operated on a similar principle. The system is supplied with air under pressure to an air line from a compressor driven by the tractor's prime mover in a conventional manner. For simplicity many conventional integers such as air dryers, variable load valves responsive to the load on the road wheel axles, and relays are omitted from the drawings but will usually be employed in a conventional manner. Single circuit protection valves may be fitted close to each of the reservoirs so that should one service line fail, the feed to the other line will continue to be maintained to enable the brake system to function.

The tractor unit comprises a main air tank M which can supply pressurised air to a line N under the control of a driver's foot brake pedal T, the line N terminating in a connector whereby it may be connected by a flexible line to a conventional connector $N_1$ leading to a corresponding line $N_2$ in the trailer. this line is the principal service line of the tractor-trailer.

The conventional tractor unit also comprises an auxiliary air tank B which is connected via the line R and a flexible connector $R_1$ which leads to a corresponding line $R_2$ in the trailer. This is an emergency line. The auxiliary air tank B is also connected via a line P to a flexible line which may be connected to connector $P_1$ which leads to a corresponding line $P_2$ in the trailer. This line is the so-called "dead man line".

The trailer is provided with a brake chamber G, H, I and J associated with each wheel which may be of the double diaphragm type as shown in FIG. 5 or a spring brake type as shown in FIG. 6.

Air lines to each brake chamber are connected to a relay emergency valve F which, in turn, is connected to a trailer air tank K. Thus, when the driver operates the foot brake pedal T, pressure is applied via lines N, $N_1$ and $N_2$ and hence the relay emergency valve F causing the valve to open and pressurised air is then applied from the tank K to the brake chambers G, H, I and J causing the vehicle brakes to be actuated.

The line R, $R_1$ and $R_2$ is also connected to the relay emergency valve F and is such that if the pressure of the air in the auxiliary air tank B or in the line $R_2$ does not reach a certain predetermined level then the relay emergency valve will be caused to open and permit pressurised air from the tank K to be connected to the brake chambers G, H, I and J.

Another safety feature which is conventionally incorporated in three-line systems is the line P, $P_1$ and $P_2$ which is connected to the auxiliary air tank B. This is the conventional "dead man line" and relies on pressure applied via the line P, $P_1$ and $P_2$. When the pressurised air from the auxiliary air tank B is connected to the line P, $P_1$ or $P_2$ by operation of the "dead man" valve the the quick release valve L, which operates as described with reference to FIG. 2, causes pressure to be applied the chambers G, H, I and K and the brakes to be actuated. Where spring brakes are employed the "dead man" line can operate in the same manner as the emergency secondary air line in that pressure can normally be applied to the brake chambers to hold the brakes off and release of that pressure will allow the springs to effect a braking action.

It will be apparent that all the valves mentioned in the description of the three-line system may be the same as those described in connection with the two-line system of FIG. 1 except the emergency relay valve F.

Figure 8:
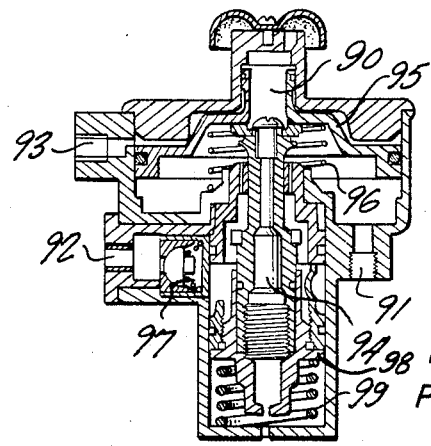
FIG. 8 is a schematic illustration of a conventional relay emergency valve suitable for use in the circuit of FIG. 7.

A schematic diagram of a conventional relay emergency valve is shown in FIG. 8. It comrises an exhaust port 90, a brake chamber port 91 for connecting to the brake chambers (G, H, I, J in FIG. 7), an emergency line port 92 for connecting to the emergency line ($R_2$ in FIG. 7), a main service line port 93 for connecting to the main service line ($N_2$ in FIG. 7) and a trailer reservoir port 94 for connecting to the trailer reservoir (K in FIG. 7).

The trailer reservoir port 94 is connected to the brake chamber port 91 to cause actuation of the brakes when pressure is applied to the main service line port 93 to cause the piston 95 to move downwardly against the action of return spring 96. Pressurised air is supplied to the trailer reservoir from the emergency line via the emergency line port and the trailer reservoir port. The non-return valve 97 ensures that air does not leak from the reservoir if pressure is released from the port 92. When a predetermined pressure is reached the emergency piston 98 is forced against the return spring 99 to its normal working position. A drop in pressure in the line to the port 92 allows the emergency piston 98 to rise connecting pressurised air from the reservoir via the reservoir port 94 and brake chamber port 91 to the brake chambers.

DETAILED DESCRIPTION OF THE AUXILIARY BRAKING SYSTEM

The auxiliary braking system according to the invention is illustrated in FIGS. 9 to 15 of the drawings. The auxiliary braking system is illustrated with reference to a three-line system but it will be appreciated that the same concepts can be embodied in a two-line system.

Figure 9:
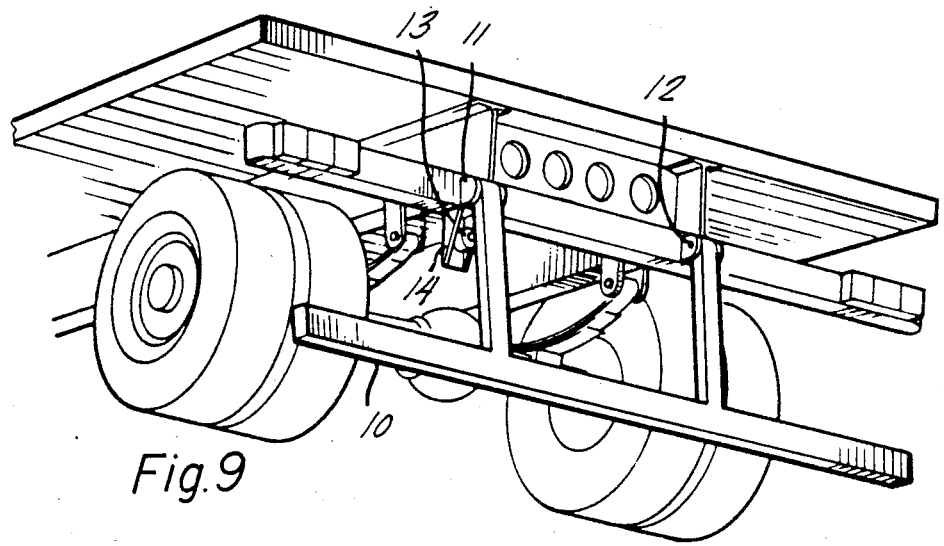
FIG. 9 is a perspective view showing diagrammatically, the rear of a vehicle or trailer having a detector bar fitted thereto in accordance with the present invention.

FIG. 9 of the drawings shows the rear of a vehicle fitted with one form of detector according to the invention. The detector is in the form of a detector bar 10 which is pivoted at 11 and 12 to a bar 13 fixed to the vehicle. The detector bar 10 may be provided with means such as spring means (not shown) to bias it outwardly from the rear of the vehicle into its inoperative position. Limiting means (not shown) may also be provided to limit the amount of outward movement of the bar 10.

The detector bar 10 can pivot towards the rear of the vehicle about the pivots 11 and 12 from the inoperative position to an operative position in which it opens the control valve 13 which is normally closed and which is mounted on a bracket 14 rigid with the vehicle. The valve 13 shown is a mechanically actuated valve but this may be replaced by an electrical switch which completes an electrical circuit to operate an electrically operated control valve such as a solenoid valve.

The biassing of the bar should be such as to achieve the desired sensitivity so that a relatively small contact pressure will pivot the bar to its operative position and actuate the control valve 13 or switch.

Figure 12:
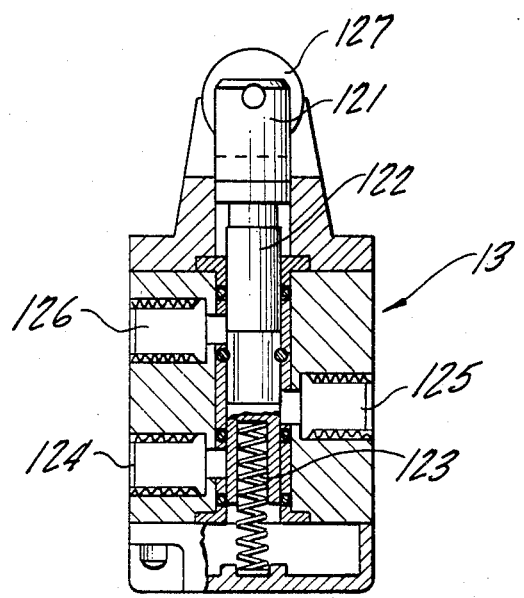
FIG. 12 is a schematic illustration of a detector valve for use at the rear of the vehicle or trailer.

The valve 13 may be a simple valve such as that shown in FIG. 12. The operating plunger 121 has a contact roller 127 and is arranged to operate a valve member 122 biassed by spring means 123 into the position shown in FIG. 12. A source of pressurised air is connected to the inlet 124. When the plunger 121 is depressed such as by movement of the bar 10, this air is connected to the outlet 125 to supply pressurised air to the next stage of the auxiliary braking system. When the bar returns to its original position the plunger 121 returns to the position shown in FIG. 12 thereby connecting the outlet 125 to the outlet 126. This outlet may be a vent to atmosphere to release the pressurised air or it may be blanked off if the vent to atmosphere is provided in another part of the auxiliary circuit.

A suitable valve for this purpose has been found to be a Scovill valve No. B53003 RS 020 marketed in U.K. by Schrader Fluid Power Division.

Figure 10A:
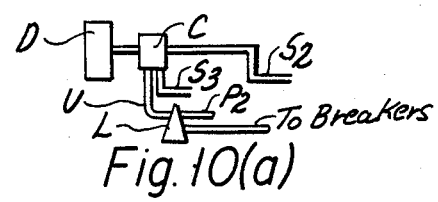
FIG. 10(a) illustrates an alternate embodiment which makes use of the "dead-man" line in a conventional three-line system.
Figure 10:
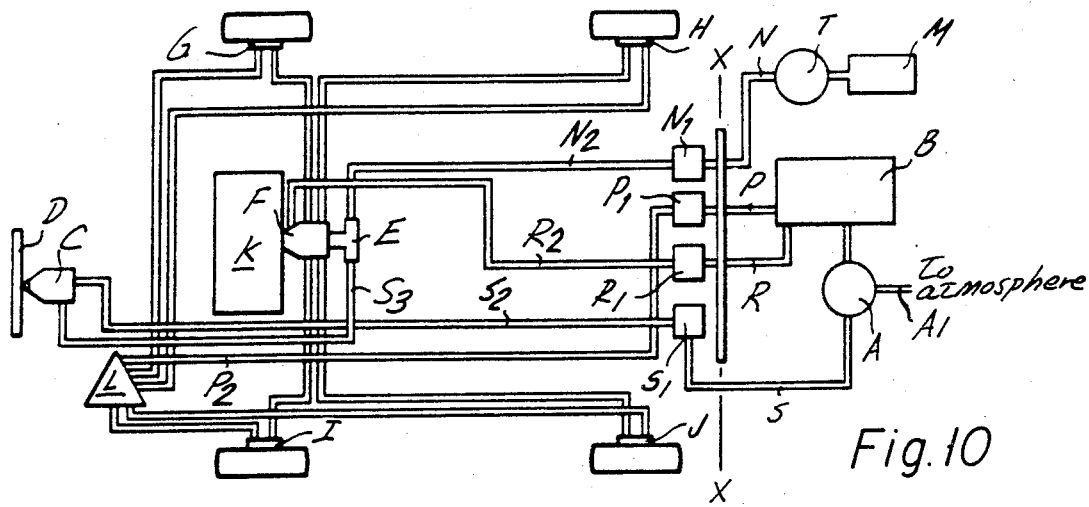
FIG. 10 is a simplified circuit diagram of a conventional three line system as shown in FIG. 7 modified in accordance with the present invention.

Referring now to FIG. 10 the auxiliary braking system also includes a valve A connected to the secondary air tank B. This valve is operated in association with the reverse-selector of the vehicle and is such that is connects pressurised air to the line S from the tank B when the reverse-selector is in a vehicle reversing condition. When the selector is in a non-reversing condition then the line S is vented to atmosphere via $A_1$.

An example of an arrangement which is suitable to fulfill the function of valve A is illustrated diagrammatically in FIG. 12. The valve 131 may be of the same type as that described above and shown in FIG. 13, the inlet 134 corresponding to inlet 124 and inlet 136 corresponding to inlet 126. The outlet corresponding to outlet 125 is not visible in FIG. 13.

In order to operate the valve 131 a bar 137 is rigidly fixed to operating rod 132 which is connected between gear lever 133 and a gear box (not shown) as in a conventional gear shift arrangement. The bar 137 carries a plate 138 which contacts the roller 139 corresponding to roller 127 in FIG. 12. Thus when the gear operating rod 132 is rotated by the lever 133 to a "reverse" position the plate 138 contacts the roller 139 and as the rod 132 is moved longitudinally to effect the shift into reverse gear the roller 139 can roll on plate 138 with the valve plunger remaining depressed. When the valve plunger is depressed by virtue of reverse gear being selected the inlet 134 is connected to the outlet and when the gear is shifted out of reverse the outlet is connected to inlet 136 which is a vent to atmosphere.

A first embodiment of the auxiliary braking system according to the invention is shown in FIG. 10 which is similar to the conventional circuit shown in FIG. 7 except that valves A and C are included together with the line S, $S_1$, $S_2$, $S_3$ and the valve E. Valve A is connected between the air tank B and the line S to a conventional type of connector $S_1$ similar to the connectors $N_1$, $P_1$ and $R_1$. To assist identification a line and connector of a different color can be provided.

In the embodiment shown in FIG. 10 the auxiliary circuit fluid control valve E is a spool valve or shuttle valve.

Figure 13:
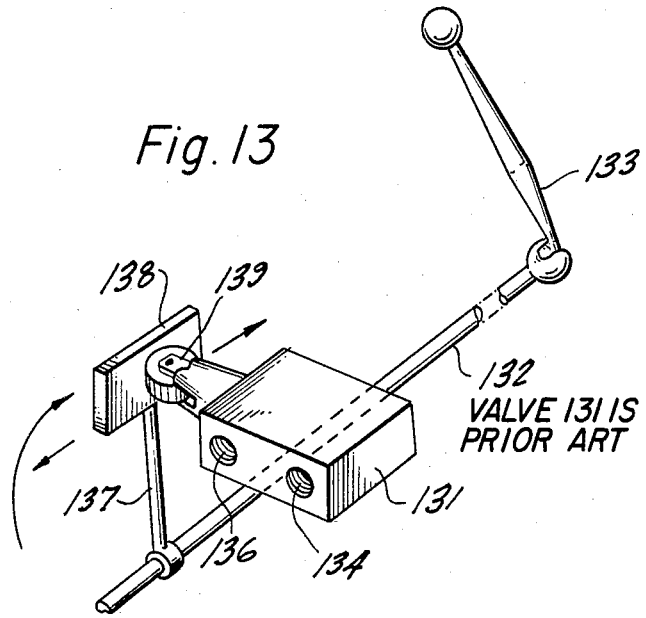
FIG. 13 is a schematic illustration of a valve shown associated with the reverse selector of the vehicle.

The connector $S_1$ is connected to line $S_2$ to the inlet of valve C which may be of the type shown in FIG. 13. The outlet of valve C is connected to a line $S_3$ which leads to a shuttle valve E connected in the line $N_2$ before the relay emergency valve F.

Figure 14:
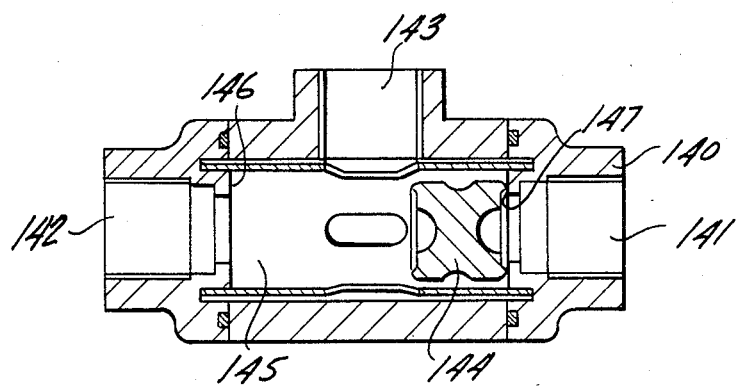
FIG. 14 is a schematic illustration of a shuttle valve suitable for use in the circuit of FIG. 10.

A typical shuttle valve which may be employed as valve E is shown in FIG. 14. It comprises a body 140 having a first inlet 141, a second inlet 142 and an outlet 143. A shuttle 144 is slidable in the chamber 145 and can seat on seats 146 or 147 to seal inlets 141 and 142 respectively. A suitable shuttle valve is a standard spool valve as Model No. 295036 available from Bendix Westinghouse Limited.

Thus when pressure is applied via the inlet 142 the shuttle 144 will seat on 147 closing inlet 141 and connecting the inlet 142 to the outlet 143. Similarly pressure applied via the inlet 141 will cause the shuttle 144 to seat on 146 closing the inlet 142 and connecting inlet 141 to the outlet 143.

Referring again to FIG. 10 the connection of valve E to the line $N_2$ corresponds to inlet 141, the connection to the line $S_3$ corresponds to inlet 142, and the connection to the valve F corresponds to outlet 143.

The first control valve C is actuated by the detector bar D movable between an inoperative position and an operative position when it is deflected by an object. When the detector bar D is in the operative position is causes control valve C to open and thereby connects the line S, $S_1$ and $S_2$ to the line $S_3$ which applies pressure from the auxiliary tair tank B to the shuttle valve E, causing the line N, $N_1$ and $N_2$ to be shut off and applying pressure to the relay valve F. This pressure causes the relay valve F to operate and apply pressure from the air tank K to the brake chambers G, H, I and J and thus causes actuation of the brakes.

The auxiliary braking system described above is extremely simple to add to the existing braking system as it merely comprises the valve A to be operated by the reverse selector of the vehicle, the lines S, $S_1$, $S_2$ and $S_3$, the control valve C and the shuttle valve E. It will be seen that the addition of this auxiliary system in no way affects the existing braking system as it is merely necessary to insert the shuttle valve E in the connection between the line $N_2$ and the relay emergency valve F.

The operation of the above described auxiliary braking system will now be described.

When the driver wishes to reverse the vehicle it is necessary for him to select a vehicle reversing condition of the reverse selector. This opens the valve A causing pressure to be applied along the line S, $S_1$ and $S_2$ from the air tank B to the control valve C. The driver will then be able to reverse the vehicle normally until the detector bar D strikes an object and is deflected thereby. The detector bar D will move towards the vehicle as a result of the impact to open the control valve C thereby connecting the pressurised air in line $S_2$ to line $S_3$ and the shuttle valve E causing relay emergency valve F to actuate the vehicle brakes. It will then be impossible for the driver to reverse any further, and experience has shown that a fully laden articulated vehicle will stop from normal reversing speed in about three inches. If the driver now selects a condition other than the reverse condition of the selector, the valve A will be closed and the line S connected to atmosphere by the exhaust $A_1$ so that the pressure applied to the shuttle valve E and relay valve F will be released and the driver can then move the vehicle.

It will be appreciated however, that this will only occur where the detector D has remained in its operative position to maintain the control valve C in the open position, i.e. where the detector has contacted an object immovable under the force applied by the detector D. Where the detector D contacts a movable object such as a person, then it is possible that the person will cease to apply pressure to the detector D, for example, the person may fall and the control valve C will then be closed as the detector moves to its inoperative position.

It will be seen that in this situation, it will not be possible for the driver to move the vehicle in any direction since the brakes will be applied via the relay emergency valve F, but the closing of the control valve C will prevent exhaustion of the pressurised air in the line $S_3$ to the exhaust $A_1$. In consequence, the driver will not be able to move the vehicle either forwards or backwards.

In order for him to move the vehicle it will be necessary for the detector D to be moved again in order to open the control valve C causing the air to exhaust the pressurised air to atmosphere. In normal circumstances this will involve the driver in walking to the rear of the vehicle in order to effect the necessary deflection of the detector D and he will then have the opportunity to inspect the object which has been struck. It is believed that this is a considerable safety factor in that if the detector bar does strike a movable object, the driver must leave his vehicle and go round to the rear to deflect the detector bar before he can move the vehicle either forwards or backwards.

The exhaust to atmosphere need not be made through the valve A but could be made, for example, also through valve C. Such an arrangement would provide for actuation of the brakes when the detector is deflected to its operative position whilst the vehicle is reversing and the brakes would remain applied until the driver selects a condition of the reverse selector other than reverse or the detector moves to its inoperative position.

When the exhaust to atmosphere is provided on the side of the control valve C which is connected to the source of pressurised air (e.g. in the line S, $S_1$, $S_2$ or valve A in this embodiment) and there is no provision for exhausting the air line ($S_3$ in this embodiment) to the valve which causes actuation of the brakes then it will be necessary for control valve C to be open for exhausting to take place and the brakes to be released.

The provision of the exhaust in the valve associated with the reverse selector of the vehicle also ensures that the brakes can be released only when the selector is in a condition other than the vehicle reversing condition, but it will be apparent that if this feature is not required the exhaust could be located in a different part of the circuit.

An alternative embodiment of the invention is shown in FIG. 10(a). This embodiment makes use of the "deadman" line in a conventional three-line system and the auxiliary circuit fluid control valve is comprised by utilising the exhaust port of a quick release valve in the existing line.

In this embodiment the control valve C is not connected to the shuttle valve E by the line $S_3$ but is connected by a line U to a quick release valve L, at the exhaust outlet corresponding to outlet 54 shown in FIG. 2, which is incorporated in the "dead-man" line P, $P_1$ and $P_2$. The operation of the quick release valve L by pressure applied through the line S, $S_1$, $S_2$, $S_3$ and detector valve C and line U will cause the pressure from the auxiliary air tank B to be applied to the brake chambers causing braking of the vehicle. This system has the disadvantage with respect to the system described above, in that it is slower to operate by virtue of the fact that the air line is connected to a remote air tank B and quicker operation can be obtained by connection to the trailer air tank K. The venting to atmosphere to release the brakes will, of course, now take place via the detector valve C if provided with a vent to atmosphere or via valve A.

The embodiment described above can, be modified by connecting the line U to the inlet of the quick release valve corresponding to inlet 52 in FIG. 2. The connection may be made by means of a shuttle valve similar to valve E in FIG. 14 with the lines $P_2$ and U connected to the shuttle valve inlets and the outlet of the shuttle valve connected to the inlet of the quick release valve. The provision of a shuttle valve as the auxiliary circuit fluid control valve leaves the exhaust port (corresponding to outlet 54 of FIG. 2) to fulfill its normal function to provide a quick release of the brakes whereas this release is much slower if the release of pressurised air from the brake chambers takes place through valve A. It will be apparent however that the exhausting will still take place when a fluid path is provided to atmosphere through valve C and/or valve A.

Figure 11:
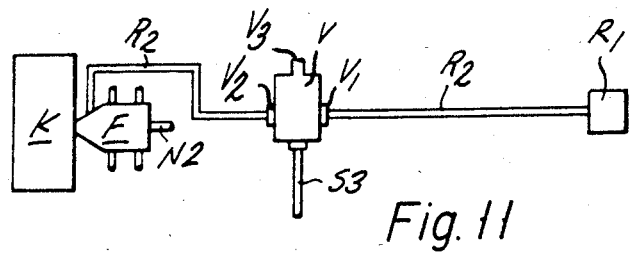
FIG. 11 is a simplified circuit diagram of an alternative modification in accordance with the invention to the conventional circuit of FIG. 7.

A further alternative form of the invention is shown in FIG. 11. This arrangement is applicable to both two-line and three-line systems and utilises the emergency line $R_2$ and the relay emergency valve F of an existing braking system.

In FIG. 11 the designation of the relevant components is the same as shown in FIG. 10, with the exception that the auxiliary circuit fluid control valve is an additional valve V inserted in the line $R_2$ to the relay emergency valve F. The relay emergency valve F is connected to the main service line $N_2$ and the vehicle brakes G, H, I and J as in FIG. 10.

The emergency line $R_2$ is normally maintained under pressure and the brakes are operated by means of the relay emergency valve F when there is a drop in pressure in the line $R_2$. The valve V is a three-way pilot-operated valve which is connected to the line $S_3$ from the first control valve C, as shown in FIG. 10.

Figure 15:
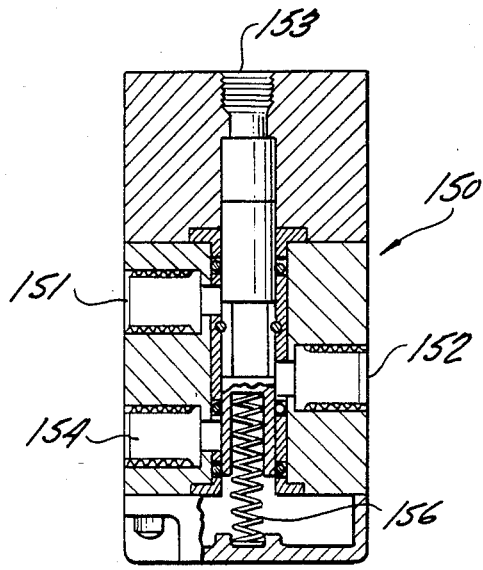
FIG. 15 is a schematic illustration of a three way valve suitable for use in the auxiliary braking circuit of FIG. 11.

A schematic diagram of a suitable three-way valve for use in this embodiment of the invention is shown in FIG. 15. The valve comprises a body 150 having an inlet 151 normally connected to an outlet 152. In FIG. 10 the inlet 151 and outlet 152 correspond to connections $V_1$ and $V_2$. The inlet 153 corresponds to $S_3$ in FIG. 10 and the outlet 154 to $V_3$. A suitable 3-way valve for this purpose is an air pilot operated 3-port valve Model No. 53003 PS available from Schrader.

It will be seen that since inlet 151 is normally connected to outlet 152, pressure in line $R_2$ will be maintained at the relay emergency valve F. Pressure applied to the inlet 153 however will cause valve element 155 to move downwardly against the pressure of spring 156 thereby isolating the inlet 151 and connecting the outlet 152 to atmosphere via the outlet 154.

Referring again to FIG. 10, when the detector D is moved to its operative position, it causes pressure to be applied via the lines S, $S_1$, $S_2$ and $S_3$ to the three-way pilot operated valve V and this valve causes the inlet of air at $V_1$ to be interrupted and the outlet at $V_2$ to be connected to an exhaust $V_3$. Thus the pressure in the line $R_2$ to the relay emergency valve F is reduced to atmospheric pressure and the relay emergency valve F causes pressurised air to be applied from tank K to the It will be seen that, as with the arrangements of FIG. 10, the valve V will remain in this condition even if the detector D returns to its inoperatiave position, as the line $S_3$ can be exhausted to atmosphere only by way of the lines $S_3$, $S_2$ and S and the valves C and A.

It will be readily apparent that the arrangements described can also be adapted to two-line and three-line systems which utilise spring brakes. A valve similar to the three-way valve shown in FIG. 15 can be connected in an emergency line of a spring brake system and operation of the brakes caused by releasing pressure in the emergency line causing the springs to effect a braking action.

It is, of course, possible to provide more than one detector at the rear of a vehicle and also one or more detector control valves. It is particularly convenient to use a single detector which extends over the width of the rear of the vehicle as shown in FIG. 1 but two or more such detectors could be used if desired.

It is possible to provide one or more additional detectors which is or are forward of a rear detector. This provides an additional safety factor in that, for example, where a human or animal moves beneath the vehicle forward of the detector at the rear of the vehicle then the brakes can be applied by deflection of an additional detector. Such an additional detector or detectors are conveniently associated with flap members disposed to the rear of the vehicle road wheels.

The driver-controlled reverse selector of the vehicle will usually be the reverse gear of a manual or automatic gear-box but it can be any reverse selector mechanism. The operation of the valve may be effected mechanically by the gear lever or a member associated therewith, or it may be effected by a member associated with any part of the mechanism for driving the vehicle in reverse. Alternatively, the member may actuate an electrical switch and the valve may be an electrically operated valve, such as a solenoid valve.

Whilst in the foregoing description the first and second control valves are described as mechanically operated valves it will be apparent that, if desired, either or both valves can be an electrically operated valve, such as a solenoid valve, operated by an electrical circuit actuated by a switch controlled by the detector and the reverse selector of the vehicle respectively.

The provision of an auxiliary braking system in accordance with the present invention can readily be installed in new vehicles as well as into existing vehicles.

Operation of the brakes in response to deflection of the detector occurs independently of any driver action other than placing the reverse selector in the vehicle reversing condition. When the reverse selector is in a condition other than the vehicle reversing condition the detector is inoperative and consequently it will not cause application of the vehicle brakes for example when a following vehicle collides with the detector.

The system also has considerable advantages over prior art systems that is is extremely simple and effective. It does not interfere with the existing braking system of a rigid or articulated vehicle other than the addition of an auxiliary circuit fluid control valve in one of the service lines of a two-line or three-line system and the auxiliary circuit fluid control valve does not affect the normal operation of the line in which it is inserted.

We claim:

1. A main air brake system for a mobile vehicle having a drive selector having reverse and other positions, a plurality of compressed-air tanks, main conduit means including a first foot-brake line and a second hand-brake line for connecting at least one of said tanks to wheel-brake chambers, and air control valves connected in said conduit means for controlling air pressure at the wheel-brake chambers, said main air brake system having associated therewith an auxiliary air brake system which includes:

(a) a first additional air control valve controlled by said drive selector;

(b) a detector member mounted at the rear of said vehicle, said detector member having a normal condition and positioned to be actuated to an actuated condition by contact with an external object during reverse movement of said vehicle;

(c) a second additional non-electrically actuated air control valve actuable in response to actuation of said detector member;

(d) additional conduit means so connecting said first and second additional air control valves as to control the pressure at said wheel-brake chambers when said detector member is in its actuated condition and said drive selector is in reverse position; and (e) a vent to atmosphere positioned and adapted to vent air from said additional conduit means when said drive selector is in a selected position other than reverse, and adapted to prevent venting air from said additional conduit means when said drive selector is in reverse position, thereby to maintain said pressure at said wheel-brake chambers when said detector member is returned to its normal condition and said drive selector is in reverse position.

2. Apparatus according to claim 1 characterized in that said vent includes a vent port in said first additional air control valve.

3. Apparatus acording to claim 1 characterized in that a third additional non-electrically actuated air valve is provided, said third additional air valve being of the shuttle type and having a first input port connected to said main conduit means and a second input port connected to said additional conduit means, whereby said wheel-brake chamber pressure is controllable either by said main conduit means or by said first and second additional air control valves in series, according to the position of said drive selector and the condition of said detector member.

* * * * *